United States Patent [19]
Bolognese et al.

[11] Patent Number: 5,757,887
[45] Date of Patent: May 26, 1998

[54] RADIOGRAPHIC CASSETTES AND APPARATUS AND METHOD FOR LOADING/UNLOADING THEREOF

[75] Inventors: Renato Bolognese, Savona; Gian Carlo Pastorino, Mallare, both of Italy

[73] Assignee: Imation Corp., Oakdale, Minn.

[21] Appl. No.: 792,724

[22] Filed: Jan. 29, 1997

[30] Foreign Application Priority Data

Feb. 1, 1996 [EP] European Pat. Off. ............ 96101383

[51] Int. Cl.$^6$ ............................................. G03B 42/04
[52] U.S. Cl. ............................................. 378/185; 378/182
[58] Field of Search ................................... 378/182, 188

[56] References Cited

U.S. PATENT DOCUMENTS

| | | |
|---|---|---|
| 4,394,772 | 7/1983 | Okamoto et al. |
| 4,541,173 | 9/1985 | Sakuma et al. |
| 4,760,641 | 8/1988 | Gandolfo |
| 4,807,271 | 2/1989 | Covington et al. |
| 5,073,916 | 12/1991 | Mirlieb et al. |
| 5,172,905 | 12/1992 | Vanous et al. |
| 5,282,236 | 1/1994 | Hayes et al. |

FOREIGN PATENT DOCUMENTS

| | | |
|---|---|---|
| 0 276 497 | 8/1988 | European Pat. Off. |
| 2 203 237 | 10/1988 | United Kingdom |

*Primary Examiner*—Craig E. Church
*Attorney, Agent, or Firm*—William K. Weimer

[57] ABSTRACT

The present invention relates to a radiographic cassette to be used for exposing a radiographic film to X-ray radiation, the radiographic cassette comprising a base element and an upper element, a front phosphor screen adhered to the inner portion of the base element, and a back phosphor screen adhered to the inner portion of the upper element, wherein the radiographic cassette has a front electrical contact on the inner portion of the base element and a back electrical contact on the inner portion of the back element, the front and back electrical contacts facing each other and being connected to respective front and back outer electrical contacts. The invention also relates to the apparatus and method for automatically loading/unloading the above radiographic cassette.

7 Claims, 4 Drawing Sheets

RADIOGRAPHIC CASSETTES AND APPARATUS AND METHOD FOR LOADING/ UNLOADING THEREOF

FIELD OF THE INVENTION

The present invention relates to a radiographic cassette to be used in an apparatus for loading/unloading a radiographic film in and from radiographic cassettes. In particular, the invention relates to a novel radiographic cassette and novel loading/unloading apparatus and method which allow the automatic detection of the loaded/unloaded condition of the radiographic cassette and the automatic activation of the loading/unloading procedure.

BACKGROUND OF THE ART

In radiography, and particularly in medical radiography, light-sensitive elements having silver halide emulsion layers coated on both faces of a transparent support (called double-side coated silver halide elements) are used. The double coated silver halide elements are generally used in combination with fluorescent phosphor screens to reduce the X-ray exposure necessary to obtain the required image. Generally, one fluorescent phosphor screen is used in association with each silver halide emulsion layer of the double coated element. The silver halide emulsions used in the double coated element are sensitized to a region of the electromagnetic spectrum corresponding to the wavelength of the light emitted by the phosphor materials used in the fluorescent phosphor screens, thus obtaining a significant amplification factor.

It is known that silver halide radiographic elements are exposed in radiographic cassettes consisting substantially of a base element, generally permeable to X-rays, hinged with an upper element, generally permeable to X-rays, which elements are joined together by a vertical perimetrical element to form a container having an essentially flat parallelepiped shape. The flat horizontal upper and base elements and the vertical element have the minimum dimensions necessary for containing a radiographic film of a certain format disposed between intensifying screens fixed to the inner portion of the upper and base elements. The screens are uniformly pressed against the film to ensure good uniform contact with the film, as known in the art. Radiographic cassettes are described, for example, in U.S. Pat. Nos. 3,323,676, 3,504,180, 4,264,821, 4,352,198, 4,630,297, and European patent applications Nos. 18,564 and 26,358.

It is known in the art that such radiographic cassettes are loaded with a radiographic film before the exposure to X-rays and are unloaded after the exposure to develop the exposed radiographic film. The loading-unloading operation is nowadays executed in automatic apparatus for the day-light loading and unloading to avoid the manual operation which should be conducted in a dark room. The apparatus for day-light loading and unloading of X-ray film cassettes comprise means for the light-tight housing of unexposed X-ray film feeding magazines, means for the light-tight housing of an exposed X-ray film including or not including radiographic cassettes, means for opening and closing the radiographic cassettes, means for introducing into and taking out an X-ray film from the cassette and means for carrying it from and towards the cassette, means for taking out a film from a feeding magazine, and pneumatic or motor-driven actuator means for each or all of the means. An example of such an apparatus is described, for example, in U.S. Pat. No. 4,760,641.

One of the main drawbacks of this type of loading-unloading apparatus relates to the absence of a mechanism to verify the presence or absence of a radiographic film in the cassette. This can cause the insertion of a second radiographic film into a cassette already containing a film (exposed or unexposed) or an attempt to extract a film from an empty cassette, with consequent damages to the phosphor screens of the cassette.

To overcome said drawback, various solutions have been proposed in the art.

U.S. Pat. No. 4,394,772 discloses a radiographic cassette comprising a built-in indicator. The built-in indicator comprises a pair of spaced plates, one of which is provided with a liquid crystal display connected to an electrical circuit powered with a solar battery. When the cassette is empty, the spaced plates are in contact with one another and the electrical circuit is shortened and the liquid crystal display is lank. When the cassette contains a film, the short-circuiting plates are isolated from each other by the film resulting in the liquid crystal indicator displaying the word "film." However, there is no provision for an automatic check within the loading/unloading apparatus and an operator interpretation error is always possible.

U.S. Pat. No. 4,807,271 discloses a radiographic cassette comprising a slidable element which can move from a first position indicating the film absence to a second position indicating the film presence. This solution provides a visual indication to the operator of the presence or absence of film. Again, there is no provision for an automatic check within the loading/unloading apparatus and an operator error is always possible.

U.S. Pat. No. 4,541,173 discloses an automatic film loading/unloading apparatus comprising an infrared light source and an infrared light detector. When the cassette is opened, the detector can detect the presence or absence of film on the lower portion of the cassette according to the intensity of reflection from the internal surface of the cassette. The detector automatically actuates the extraction or the insertion of the film as the case may be. The main disadvantage of this system is that a radiographic film may adhere to the inner surface of the upper portion during opening of the cassette due to static charges of the film sheet in surface-to-surface contact with the inner surface of the upper portion of the cassette. In this case, no film sheet is detected in the lower portion of the cassette and a second film could be erroneously put into the cassette.

U.S. Pat. No. 5,073,916 discloses an automatic film loading/unloading apparatus comprising two infrared light sources associated with two infrared light detectors and a mirror system for directing the emitted light towards the upper and lower inner portions of the opened cassette. By comparing the intensity of the light reflected from the two portions of the cassette, the system can detect the film presence (either in the upper or lower portion of the cassette) if the intensity is different, or the film absence, if the intensity is equal. This system can overcome the disadvantages of the above mentioned U.S. Pat. No. 4,541,173, but it is complex and expensive, by requiring two light sources, two detectors, a light intensity comparing device and a mirror system.

The main object of the present invention is to provide a simple and inexpensive solution to the above mentioned disadvantages.

SUMMARY OF THE INVENTION

According to a first embodiment, the present invention relates to a radiographic cassette to be used for exposing a radiographic film to X-ray radiation, the radiographic cassette comprising a base element and an upper element, a front phosphor screen adhered to the inner portion of the base element, and a back phosphor screen adhered to the inner portion of the upper element, wherein the radiographic cassette has a front electrical contact on the inner portion of said base element and a back electrical contact on the inner portion of said back element, said front and back electrical contacts facing each other and being connected to respective outer electrical contacts.

In a second embodiment, the present invention relates to an automatic film loading/unloading apparatus comprising a radiographic cassette-carrying unit which comprises means for positioning and centering a radiographic cassette as described above, means for loading a radiographic film into the radiographic cassette, means for unloading a radiographic film from the radiographic cassette, means for detecting the presence or absence of a film in radiographic cassette, and means for actuating the proper loading or unloading means depending upon the detection of the absence or presence of the radiographic film, wherein the means for detecting the presence or absence of a radiographic film comprises a pair of electrical contact units connecting the outer electrical contacts of the radiographic cassette to digital evaluating means.

In a third embodiment, the present invention relates to a method for automatically loading/unloading a radiographic cassette within an automatic loading/unloading apparatus comprising a radiographic cassette-carrying unit which comprises means for positioning and centering a radiographic cassette as described above, means for opening and closing the radiographic cassette, means for loading a radiographic film into the radiographic cassette, means for unloading a radiographic film from the radiographic cassette, means for detecting the presence or absence of a film in radiographic cassette, and means for actuating the proper loading or unloading means depending upon the detection of the absence or presence of the radiographic film, the method comprising the steps of:

positioning and centering the radiographic cassette into the radiographic cassette-carrying unit, contacting the outer electrical contacts of the radiographic cassette with a pair of electrical contact units connected to digital evaluating means, and actuating the proper loading or unloading means depending upon the result of the digital evaluation.

DETAILED DESCRIPTION OF THE INVENTION

Accordingly, the first embodiment of the present invention relates to a radiographic cassette to be used for exposing a radiographic film to X-ray radiation, the radiographic cassette comprising a base element and an upper element, a front phosphor screen adhered to the inner portion of the base element, and a back phosphor screen adhered to the inner portion of the upper element, wherein the radiographic cassette has a front electrical contact on the inner portion of said base element and a back electrical contact on the inner portion of said back element, said front and back electrical contacts facing each other and being connected to respective outer electrical contacts.

Figure 1:
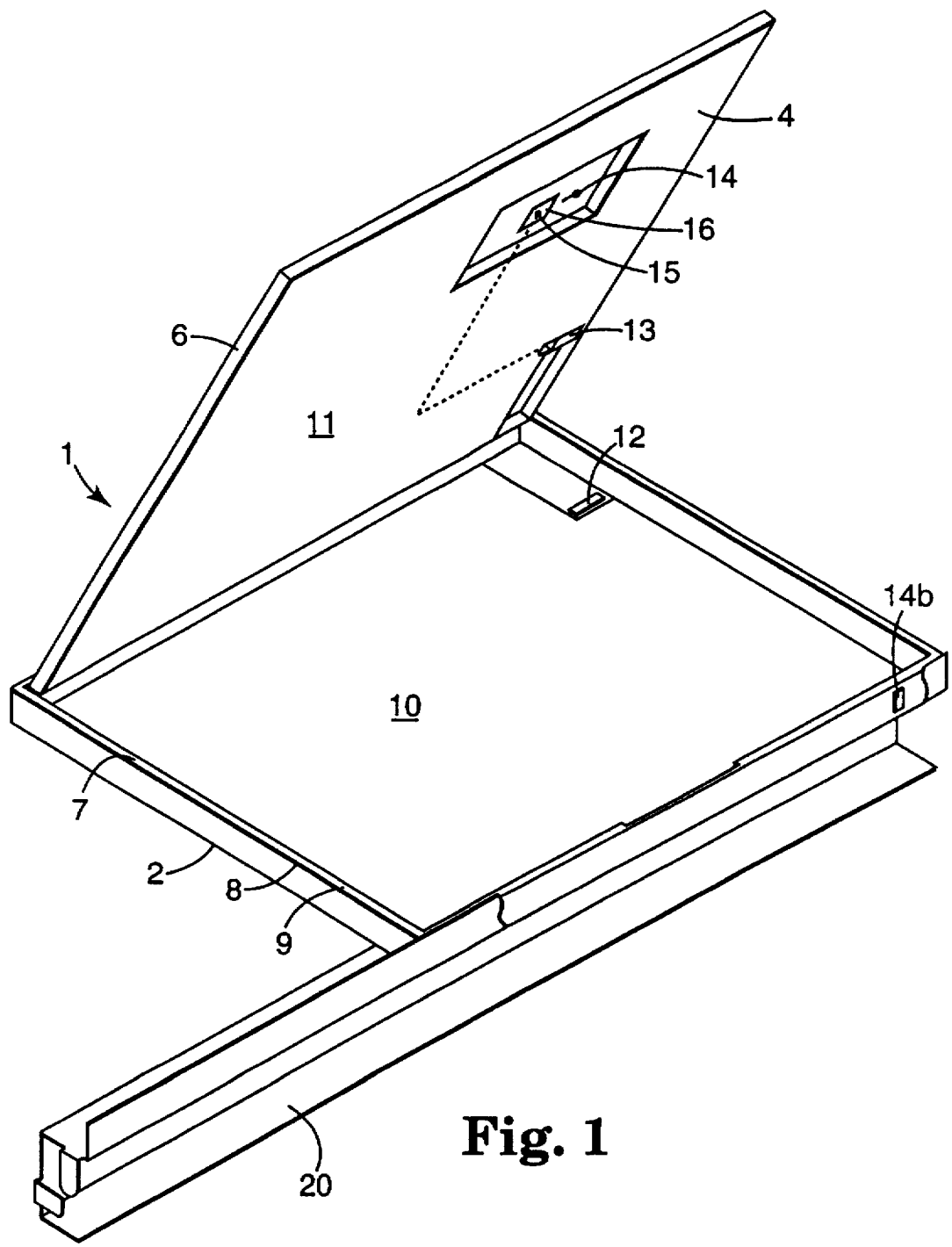
FIG. 1 is a perspective view of the cassette according to the present invention in an open state.
Figure 2:
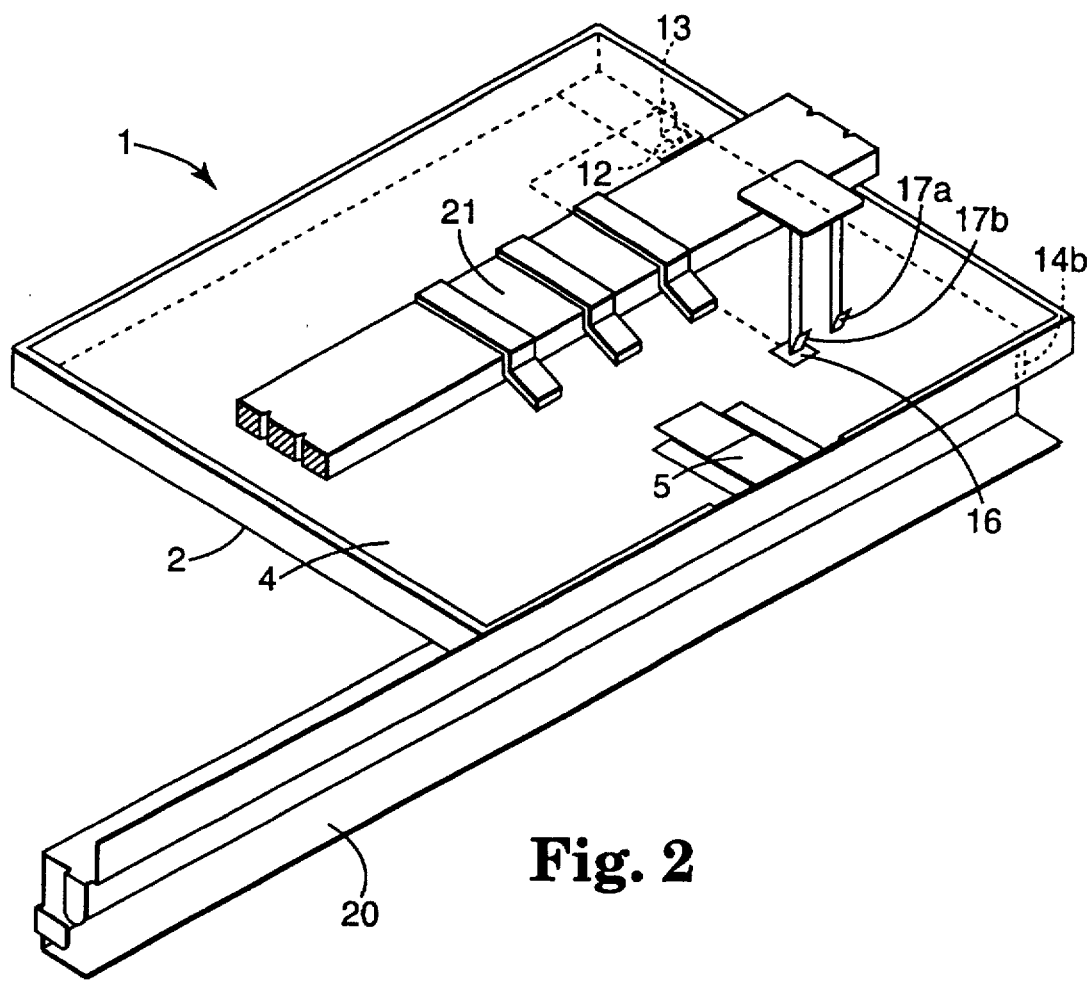
FIG. 2 is a perspective view of the cassette according to the present invention in a closed state.
Figure 3:
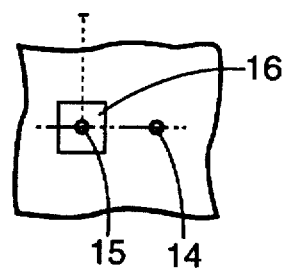
FIG. 3 is a view of the portion of the cassette upper element provided with the outer electrical contacts.

Referring now to FIGS. 1 and 2, the radiographic cassette 1 of the present invention comprises a base element 2 hinged with an upper element 4. The upper element 4 is engageable with the base element 2 by means of locking pieces 5. The upper element 4 is provided with an outer edge 6 engageable within the perimetrical groove 7 of the base element 2, formed by two perimetrical edges 8 and 9. The inner portions of the base element 2 and the upper element 4 are provided with respective front phosphor screen 10 and back phosphor screen 11.

The radiographic cassette of the present invention is provided with a front electrical contact 12 on the inner portion of said base element 2 and a back electrical contact 13 on the inner portion of said upper element 4. The front electrical contact 12 is grounded to the base or upper elements (2, 4) of the radiographic cassette 1, preferably to the base element 2. Alternatively, in case the base and upper elements (2, 4) were made of a non-conductive material, the front electrical contact 12 is connected to an outer electrical contact 14b on the outer surface of the base or upper elements (2, 4). The back electrical contact 13 is connected to an outer electrical contact 15 on the outer surface of the upper element 4. The back electrical contact 13 is isolated by means of a piece of non-conductive material 16. In case the upper element 4 of the radiographic cassette was made of a non-conductive material, the piece of non-conductive material 16 can be omitted. The front and back electrical contacts (12, 13) face each other to allow the reciprocal contact when closing the radiographic cassette.

The radiographic cassette 1 of the present invention is intended to be used in an automatic film loading/unloading apparatus comprising a radiographic cassette-carrying unit which comprises means for positioning and centering a radiographic cassette as described above, means for opening and closing the radiographic cassette, means for loading a radiographic film in a radiographic cassette, means for unloading a radiographic film from the radiographic cassette, means for detecting the presence or absence of a film into radiographic cassette, and means for actuating the proper loading or unloading means depending upon the detection of the absence or presence of the radiographic film, wherein the means for detecting the presence or absence of a radiographic film comprises a pair of electrical contact units connecting the outer electrical contacts of the radiographic cassette to digital evaluating means.

Automatic film loading/unloading apparatus are well known in the art. A detailed description of loading/unloading apparatus can be found in U.S. Pat. No. 4,760,641 incorporated herein for reference.

Figure 4:
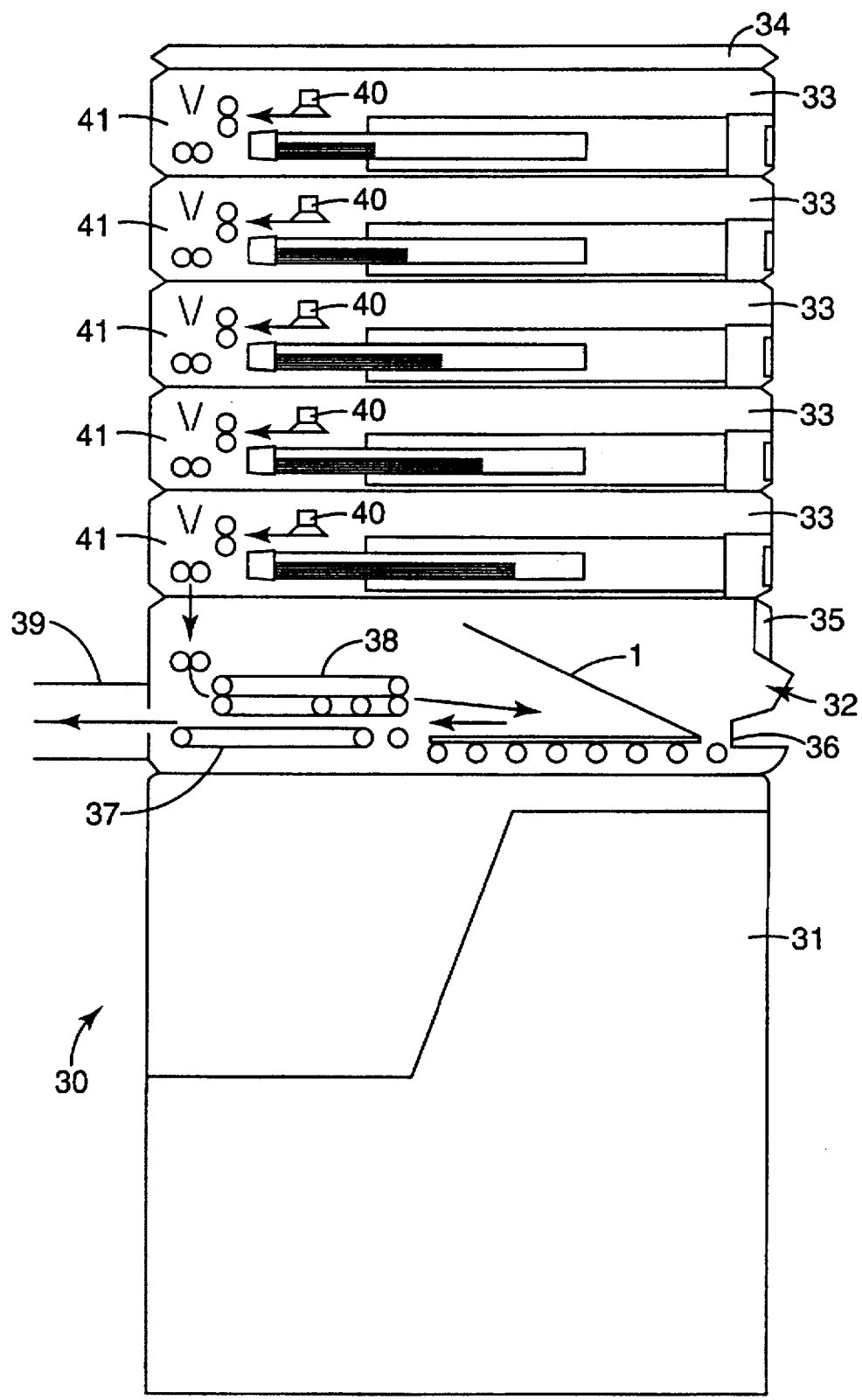
FIG. 4 is a schematic view of the automatic loading/unloading apparatus as a whole.

A schematic embodiment of the loading and unloading apparatus according to the present invention is shown as a whole in FIG. 4. The apparatus 30 essentially comprises a parallelepiped-shaped ground unit 31, a cassette-carrying unit 32 secured at the top of the ground unit 31, a series of magazine-carrying units 33 (in the illustrated example five magazine-carrying units) placed one on the other above the cassette-carrying unit 32, and a top protecting unit 34 placed on the upper magazine-carrying unit 33. Each unit 31, 32, and 33 has a supporting metallic structure to support the various components of each unit and a protecting light-tight external paneling consisting of molded plastic material component elements.

Ground unit 31 supports the cassette-carrying unit 32 and the magazine-carrying units 33 and embodies pressurized air feeding source and relative valve and distribution means connected with various actuator means of units 32 and 33, as well as most of electrical equipment and relative circuits connected with various position sensors provided also in units 32 and 33 and controlled by an electronic processing and controlling means to operate the apparatus according to programmed operation cycles which can be monitored by means of a programming and controlling panel 35 applied on the front side of the cassette-carrying unit 32. Such conventional processing and controlling means, as well as other pneumatic and electrical components whose major portion is contained inside the ground unit 31, are not shown and, for sake of brevity, are not described in detail.

The cassette-carrying unit 32 is provided with cassette handling means for positioning and centering a radiographic cassette, means for opening and closing the radiographic cassette, means 37 for taking out the exposed X-ray film and carrying it towards the apparatus outlet 39, means 38 for feeding a new X-ray film coming from one of the magazine-carrying units 33 and for introducing it to the inside of the radiographic cassette. The cassette-carrying unit 32 is also provided with a slot 36 for the insertion of the radiographic cassette 1.

Each magazine-carrying unit 33 comprises magazine handling means for the insertion of a radiographic film feeding magazine, means 40 for grasping and taking out one film at a time, and means 41 for conveying such film towards the cassette-carrying unit 32.

Referring now to FIGS. 1 and 2, there are schematically shown means 20 for positioning and centering the radiographic cassette 1 and means 21 for opening and closing the radiographic cassette 1 provided within the above described cassette-carrying unit 32. The means 21 for opening and closing the radiographic cassette 1 is provided with a pair of electrical contact units 17a and 17b. When the radiographic cassette is properly inserted into the cassette-carrying unit 32, the electrical contact units 17a and 17b are connected to the outer electrical contacts 14 and 15 of the upper element of the cassette.

Figure 5:
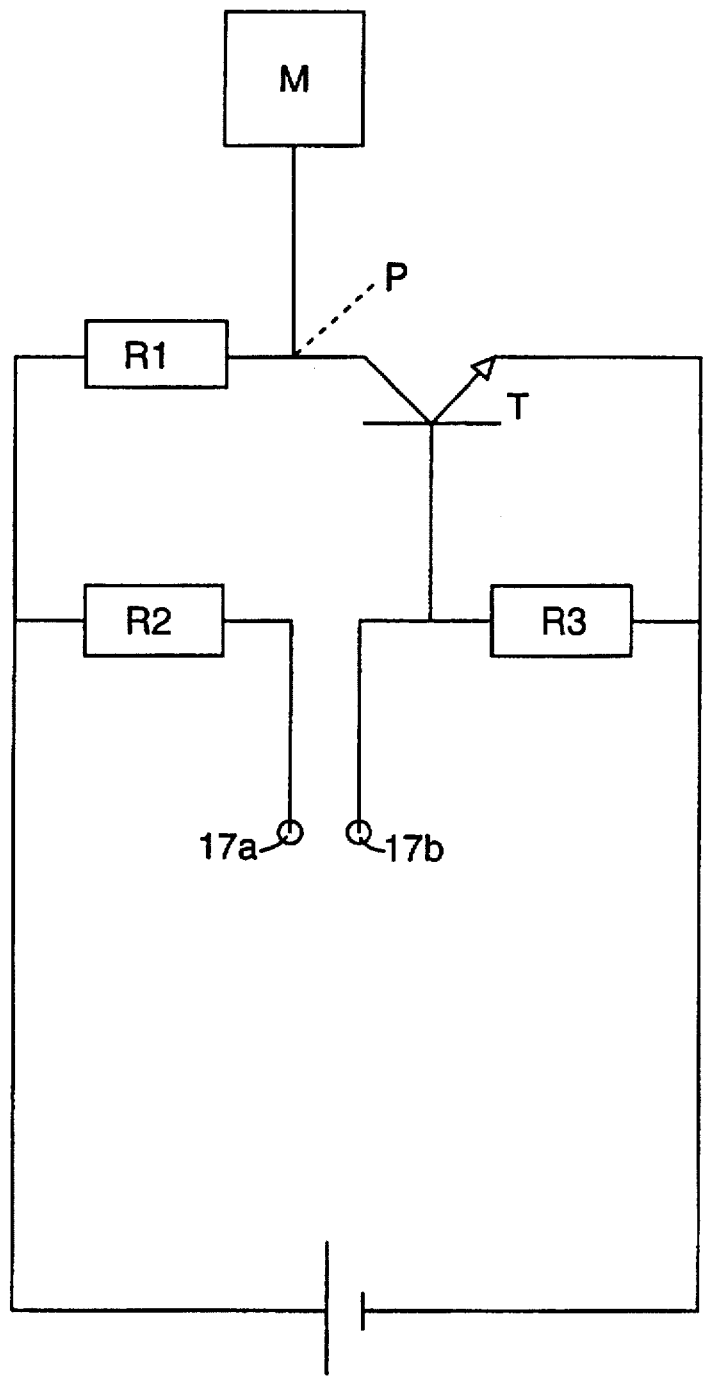
FIG. 5 is an example of digital evaluating means according to the scope of the present invention.

The electrical contact units 17a and 17b are connected to digital evaluating means which control the means (37, 38) for loading and unloading the radiographic film into or from the radiographic cassette. FIG. 5 shows in detail an example of digital evaluating means. The two electrical contact units 17a and 17b are connected to a circuit comprising a power supply, three resistors R1, R2, and R3, and a transistor T. The microprocessor M is able to detect the voltage variation at the point P of the circuit as a change of the input state. The activation of the means for loading and unloading the radiographic film is provided by a conventional actuator which is activated by a signal emitted by the microprocessor after the evaluation of the presence or absence of the radiographic film within the radiographic cassette.

The radiographic cassette is inserted into the cassette-carrying unit 32 through the means for positioning and centering the cassette. Once the cassette is correctly positioned and centered, the two electrical contact units 17a and 17b connect the outer electrical contacts 14 and 15 and the digital evaluating means. When the film is present within the cassette, the front and back electrical contacts 12 and 13 are isolated and the digital evaluating means reads the open circuit condition which corresponds to the presence of the radiographic film. When the film is absent, the front and back electrical contacts 12 and 13 contact each other and the digital evaluating means reads the closed circuit condition which corresponds to the absence of the radiographic film.

The microprocessor can detect the above mentioned open and closed conditions and activate the means for unloading the radiographic film present in the cassette or the means for loading a radiographic film into the empty cassette by sending a signal to the proper actuator. As mentioned above, the activation of the means for loading and unloading the radiographic film is provided by a conventional actuator which is activated by the signal emitted by the microprocessor after the digital evaluation.

The construction details and the embodiments of the present invention can be, of course, varied widely with respect to what is described and illustrated, without falling, however, outside the scope of the present invention.

What is claimed is:

1. A radiographic cassette to be used for exposing a radiographic film to X-ray radiation, the radiographic cassette comprising:

a base element having a base element inner portion;

a front electrical contact on the base element inner portion, the front electrical contact being connected to a first outer electrical contact;

an upper element having an upper element inner portion;

a back electrical contact on the upper element inner portion, the back electrical contact facing the front electrical contact and being connected to a second outer electrical contact;

a front phosphor screen adhered to the base element inner portion; and a back phosphor screen adhered to the upper element inner portion.

2. The radiographic cassette according to claim 1, wherein the base and upper elements are made of a conductive metal.

3. The radiographic cassette according to claim 2, wherein the front electrical contact is grounded to the base element of the radiographic cassette.

4. The radiographic cassette according to claim 2, the upper element having an outer side, the second outer electrical contact being on the outer side of the upper element.

5. The radiographic cassette according to claim 4, wherein the second outer electrical contact is isolated by a non-conductive piece.

6. The radiographic cassette according to claim 1, wherein the base and upper elements are made of a non-conductive material.

7. The radiographic cassette according to claim 6, the upper element having an outer side, the first outer electrical contact being on the outer side of the upper element.

* * * * *